May 15, 1928.

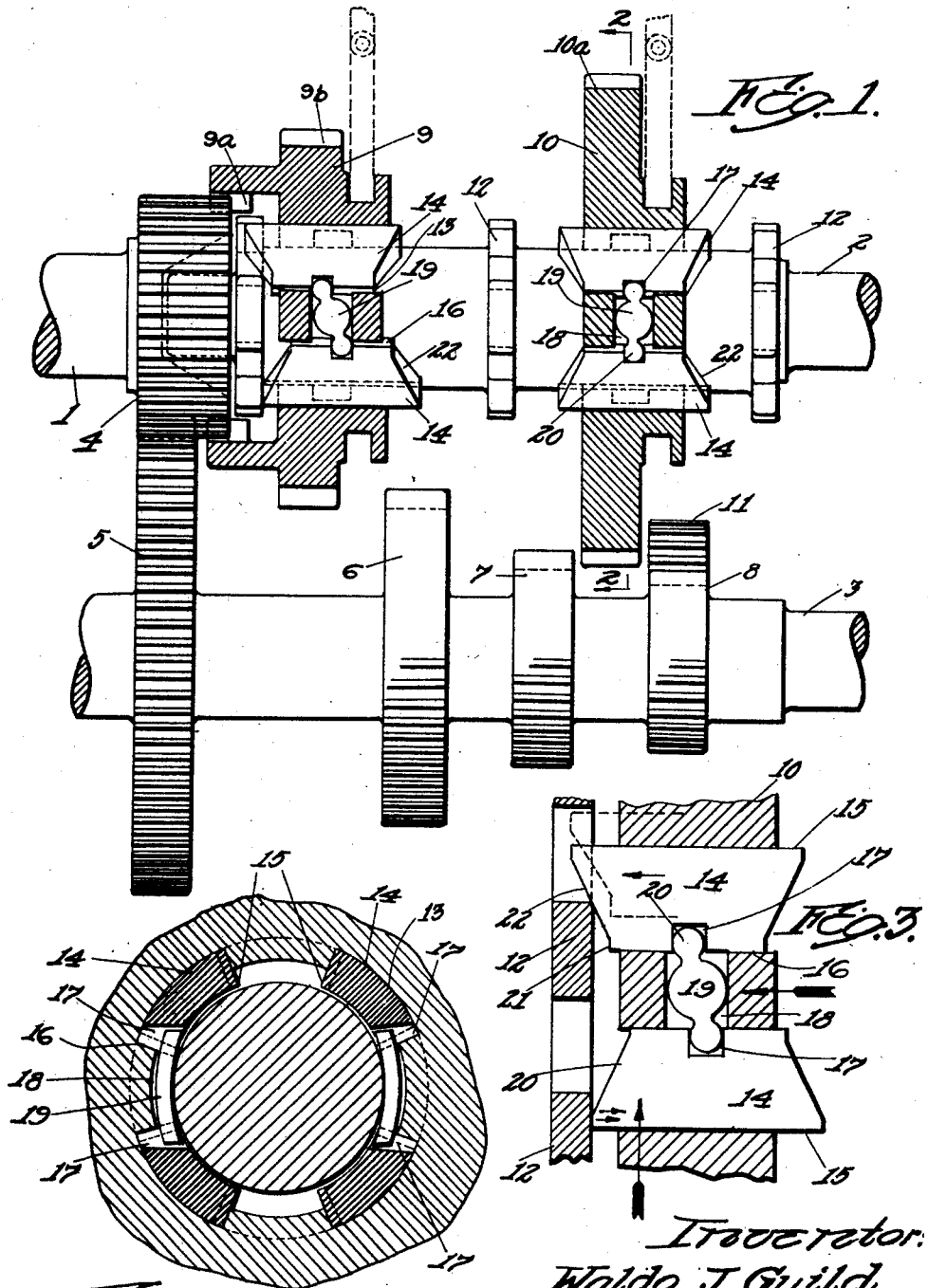

W. J. GUILD 1,669,749

DRIVING CONNECTION FOR POWER TRANSMISSION

Filed July 8, 1925

Inventor:
Waldo J. Guild
By Attorney
Owen W. Kennedy

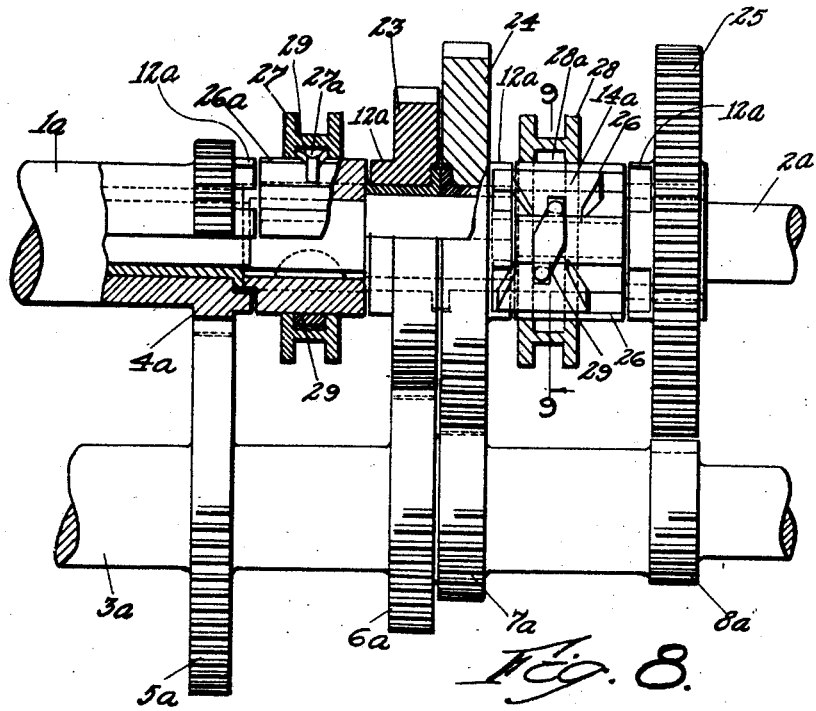
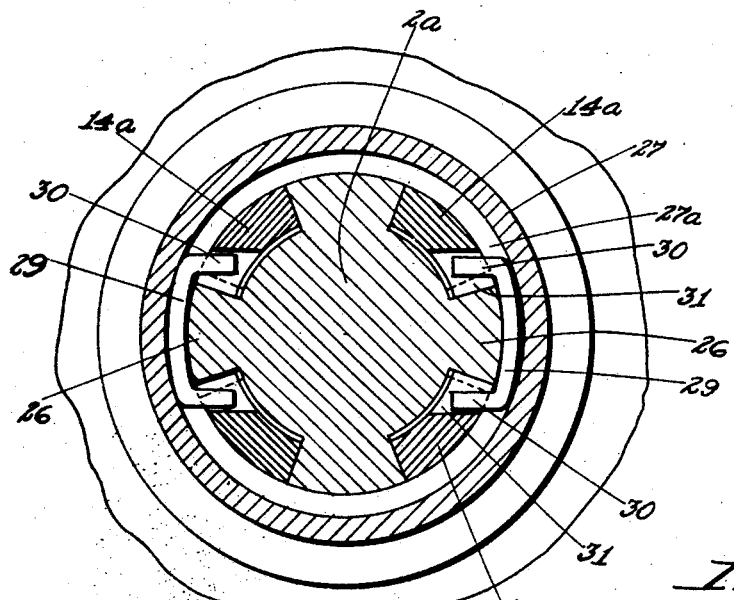

Patented May 15, 1928.

1,669,749

UNITED STATES PATENT OFFICE.

WALDO J. GUILD, OF WORCESTER, MASSACHUSETTS.

DRIVING CONNECTION FOR POWER TRANSMISSION.

Application filed July 8, 1925. Serial No. 42,294.

My invention relates to gearing for transmitting mechanical power and has particular reference to an improved device for establishing an operative driving connection between coaxial rotatable elements, one of which is connected to a suitable source of power, and the other of which is connected to a load which it is desired to drive from the source of power.

In my copending application, Serial No. 694,054, filed February 20, 1924, now Patent No. 1,564,667, granted December 8, 1925, there is shown and described an improved gearing of the selective sliding gear type commonly employed in motor vehicles, the gearing being characterized by the fact that the sliding engagement, or disengagement, of the teeth of any given pair of gear wheels is carried on while one wheel of the pair is running free. As shown in the above mentioned application, the shiftable gear member is not connected to its shaft for rotation in either direction until the gear member is shifted to a position in which it is in mesh with the other gear member of the pair, and the present invention has to do with an improved driving connection capable of performing substantially the same functions as the driving connection shown in my above mentioned application and in addition, other functions not within the contemplation of my previous invention.

For purposes of illustration, I have shown the present invention in connection with a selective sliding gear transmission, as well as in connection with a selective transmission of the type in which the various pairs of gears are always in mesh. As will hereinafter appear, my improved driving connection is also applicable to any device for power transmission in which it is desired to operatively connect two members rotatable on a common axis by relative movement of one of said members longitudinally of the axis. My improved device is characterized by its extreme simplicity and effectiveness, its operation being entirely independent of the action of any springs and serving to automatically effect a positive driving connection between both of the rotatable members, in either direction, upon completion of the longitudinal shifting movement of one of the members. The above and other advantageous features of my invention will hereinafter more fully appear, reference being had to the accompanying drawings in which Fig. 1 is a view partially in side elevation and partially in section showing my improved driving connection embodied in a power transmission of the sliding gear type.

Fig. 2 is a fragmentary vertical sectional view along the line 2—2 of Fig. 1.

Fig. 3 is a diagrammatic view showing a portion of the parts shown in Fig. 1 developed on a plane in order to better illustrate the operation of my device.

Fig. 8 is a view similar to Fig. 1, showing my driving connection incorporated in a power transmission of the constant meshed gear type.

Fig. 9 is a fragmentary transverse sectional view along the line 9—9 of Fig. 8, looking in the direction of the arrows.

Like reference characters refer to like parts in the different figures.

Figure 6:
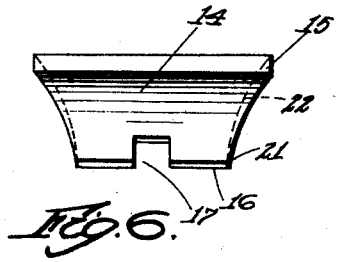
Figs. 6 and 7 are perspective views respectively, showing one of the dogs and its actuating lever removed from the gear member shown in Fig. 4.

Referring now to Fig. 1, my invention will first be described in connection with a power transmission of the selective sliding gear type. A transmission of this type generally comprises a drive shaft 1, a tail or driven shaft 2 in axial alinement therewith, and a countershaft 3 permanently connected to the drive shaft 1 by gears 4 and 5. The countershaft 3 has keyed thereon a plurality of drive gears 6, 7 and 8 which decrease in diameter in the order named and the tail shaft 2 carries loose gear sleeves 9 and 10 which are adapted to be shifted longitudinally of the shaft 2 by any suitable means, such as shifting levers, shown in dotted lines. The gear sleeve 9 is provided with internal clutch teeth 9ª and external gear teeth 9ᵇ which are adapted to be moved into mesh with the gears 4 and 6, respectively, to impart different rotative speeds to the sleeve 9 from the shaft 1, while the gear sleeve 10 is provided with teeth 10ª which are adapted to be moved into mesh with either the gear 7 or an idler gear 11 to impart rotative movement to the sleeve 10 in opposite directions of rotation, due to the fact that the idler gear 11 is in mesh with the gear 8 on the countershaft 3.

The above described speed variations obtainable between the driving shaft and the gear sleeves 9 and 10 loose on the tail shaft 2 are chosen to merely represent the speed variations which are obtainable in the usual type of selective sliding gear power transmission employed in motor vehicles. This particular type of gearing is shown merely as an illustrative embodiment of my invention which has to do entirely with an improved driving connection for automatically coupling either of the sleeves 9 and 10 to the tail shaft 2 after a sleeve has been moved on the shaft 2 to bring its teeth in mesh with the teeth of one of the gears on the countershaft 3, or on the drive shaft 1, as will now be described.

As best shown in Figs. 1 to 5, the tail shaft 2 is provided with sets of abutments 12 with radially extending surfaces and each of the sleeves 9 and 10 is provided with internal longitudinally extending slots 13 corresponding in number to the number of abutments 12 in each set. The slots 13 of each of the sleeves 9 and 10 are adapted to receive cooperating pairs of dogs 14, 14, which dogs 14 are slidable within the slots 13 and portions thereof are adapted to be projected from either side of the corresponding sleeve into the spaces between a given set of abutments 12 to establish a driving connection between a sleeve and the tail shaft 2. Inasmuch as the construction, arrangement and operation of the dogs 14 carried by each of the sleeves 9 and 10 is the same, a description of one pair of cooperating dogs in the sleeve 10 will suffice for the understanding of my invention.

As clearly shown in Figs. 2 and 6, each dog 14 is curved on two of its bounding surfaces so as to slide freely between the rounded bottom of the slot 13 within which it is received, and the outer peripheral surface of the shaft 2. Each dog 14 also provides a plane abutment engaging surface 15 which is radially disposed with respect to the central axis of the shaft 2 and this surface 15 is considerably longer than the width of the sleeve 10, so that portions of each surface 15 always project on either side of the sleeve 10 in any position of the dog 14. Each dog 14 also provides another radial surface 16 which is substantially of the same length as the width of the sleeve 10, and these surfaces 16 are opposed to each other when a pair of dogs 14 are received in the slots 13.

Figures 5, 7:
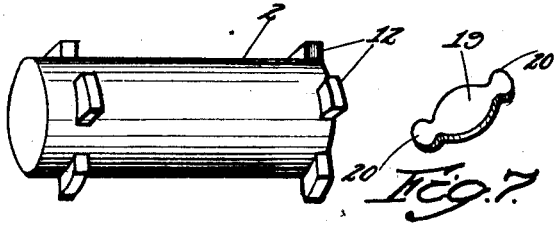
Fig. 5 is a perspective view of a portion of the shaft on which the gear member of Fig. 4 is shiftable.
Figure 4:
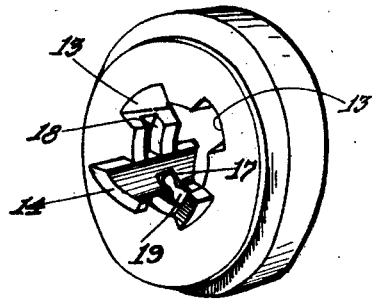
Fig. 4 is a perspective view of a gear member carrying the clutching dogs.
Figure 11:
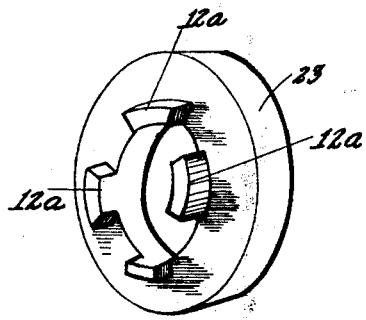
Fig. 11 is a perspective view of a gear member carrying abutments to cooperate with the dogs shown in Fig. 8.
Figure 13:
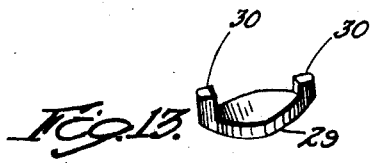
Fig. 13 is a perspective view of one of the operating levers carried by the sleeve shown in Fig. 10.
Figure 12:
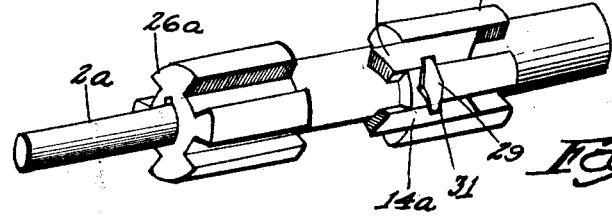
Fig. 12 is a perspective view of a portion of the shaft shown in Fig. 8, with the shifting sleeves removed therefrom.
Figure 10:
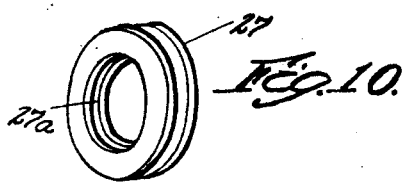
Fig. 10 is a perspective view of one of the shiftable sleeves for operating the driving connection shown in Fig. 8.

As best shown in Figs. 1, 3 and 4, the surface 16 of each dog 14 is provided with a notch 17, and the radial portion of the sleeve 10 between adjacent slots 13 is provided with a seat 18 just wide enough to receive the rounded middle portion of an actuating and equalizing lever 19 which serves to connect a pair of dogs 14 together. As shown in Fig. 7 the lever 19 is provided with rounded end portions 20, 20, each just wide enough to be received in the opposed notches 17 provided by the dogs 14. It is evident from a consideration of Fig. 3, which is a developed view of a pair of dogs 14, that movement of one of the dogs 14 in its slot 13 in one direction will be accompanied by a corresponding movement of the other dog 14 in its slot 13 in the opposite direction. In other words, the connecting lever 19 acts as an equalizer between a pair of dogs, so that when a force is applied to either one of the dogs 14, to cause its longitudinal movement, this force will be applied equally to the other dog to cause its movement in the opposite direction. The levers 19 are so constructed that the longitudinal movement of the dogs 14 is limited in both directions by reason of the fact that when the dogs 14 have been moved in the slots 13 a predetermined amount, the rounded end portions 20 of the lever 19 come into contact with the edges of the seat 18, thereby preventing further turning movement of the lever 19 in the seat 18, with the resulting limitation of the movement of the dogs 14. By this arrangement, it is impossible to move any of the dogs 14 out of its slot 13 when once a dog 14 has been placed in position within the sleeve 10 with the ends of the lever 19 connecting the dog to its mate. Since the mere disposal of the shaft 2 within the sleeve 10 prevents radial displacement of the dogs 14, it is obvious that each pair of dogs will always remain in an operative condition ready to effect a driving connection between the corresponding sleeve and the shaft 2, as will now be described.

Referring again to Fig. 1, the sleeve 10 is shown in what might be termed a "neutral" position, with its gear teeth 10ª entirely out of engagement with either of the gears 7 and 11, and with the projecting surfaces 15 of the dogs 14 entirely out of engagement with the abutments 12 on each side of the sleeve. Let it now be assumed that the sleeve 10 is shifted to the left to bring its teeth 10ª into engagement with the gear 7, so that then the sleeve 10 will be rotated in the direction of the vertical arrow in Fig. 3 simultaneously with the bodily movement of the sleeve 10 toward the abutments 12, as indicated by the horizontal arrow applied to the cross-hatched portion of the sleeve in Fig. 3.

It will be evident from a comparison of Figs. 1 and 3, that the first part of the shifting movement will result in a meshing of the gear teeth 10ᵃ with the gear 7 while the sleeve 10 is entirely free to rotate on the tail shaft 2, so that there is no possibility of clashing of the gear teeth. However, as the sleeve 10 completes its shifting movement to bring the teeth fully in mesh, the dogs 14 are automatically operated in response to the combined motion of rotation and translation of the sleeve 10, to effect a driving connection between the sleeve and its shaft 2.

This automatic operation of the dogs 14 is best illustrated in Fig. 3, in which the end of the lower dog 14 is shown as having engaged one of the abutments 12, so that further movement of the sleeve 10 to the left from the position of Fig. 3 to complete the meshing of the gears causes a longitudinal displacement of the lower dog to the right, in relation to its sleeve 10. This movement is accompanied by a corresponding displacement of the upper dog 14 to the left, due to the equalizing action of the lever 19. This results in the upper dog 14 being projected into the space between the next adjacent pair of abutments 12, so that continued rotation of the sleeve 10 will result in an engagement between the surface 15 with an abutment 12, as shown in dotted lines in Fig. 3. In this position of the dogs 14, the sleeve 10 is adapted to drive the shaft 2 in one direction of rotation, and as the sleeve 10 completes its shifting movement to the left, the corner of the abutment 12 engages a shoulder 21 at the base of the inclined end surface 22 of the dog which is wider than the spaces between abutments 12 and by its reaction through lever 19 projects the other dog 14 into the space between the next adjacent pair of abutments 12. This brings the surface 15 of the lower dog 14 into full contact with an abutment 12, thereby locking the sleeve 10 to the shaft 2 for either direction of rotation.

It will be evident from a consideration of Fig. 1 that the above described operation of the dogs 14 occurs very rapidly during the very last part of the shifting movement of the sleeve 10 to the left, at which time the gear teeth 10ᵃ on the sleeve will have been sufficiently enmeshed with the teeth of gear 7 for driving; consequently there will be no possibility of any clashing of gears as the rotating dogs pick up the tail shaft 2, with the above described ratcheting action, to impart the rotative movement of the gear sleeve 10 thereto. This picking up of the shaft 2 by the dogs 14 occurs entirely automatically, for all that the operator has to do is to carry out the shifting movement of either the gear sleeve 10, or the gear sleeve 9, to bring the sleeve completely into mesh with any one of the gears 4, 6, 7 or 11. The dogs 14 are so formed that they possess great strength in the direction in which they are subjected to a shearing action when picking up the abutments 12 on the shaft 2, and it is evident that the large bearing surfaces 15 and 16 on the dogs 14 substantially eliminate wear. The fact that the dogs 14 are coupled together in pairs and are symmetrical insures that the driving connection between either gear sleeve and the shaft 2 will always be effected for either direction of rotation, for the reason that the shifting movement of a sleeve to project one dog of a pair into engagement with an abutment 12 positively insures that the other dog will be also projected into a similar position, as the movement of the first projected dog brings its shoulder 21 into engagement with the corner of an abutment 12.

As previously pointed out, my invention is applicable to other types of transmissions, and in Figs. 8 to 13 inclusive, my invention is illustrated as being embodied in a selective transmission, in which the various pairs of gears are constantly in mesh. In this embodiment of my invention, the dogs are carried by a member which has only motion of translation instead of having a motion of both translation and rotation, as in the transmission shown in Fig. 1 while the abutments are carried by rotative members; and it will be hereinafter shown how my driving connection is just as effective for this modified arrangement as with the arrangement previously described.

Referring to Fig. 8, the transmission generally comprises a drive shaft 1ᵃ, a tail or driven shaft 2ᵃ in axial alinement therewith, and a countershaft 3ᵃ permanently connected to the drive shaft 1ᵃ by gears 4ᵃ and 5ᵃ, all of these members being purposely given the same reference numerals as the correspondingly numbered parts in Fig. 1, inasmuch as they perform the same function in the transmission. The countershaft 3ᵃ has keyed thereon a plurality of drive gears 6ᵃ, 7ᵃ and 8ᵃ which decrease in diameter in the order named, and the tail shaft 2ᵃ carries loose gears 23 and 24 which are permanently in mesh with the gears 6ᵃ and 7ᵃ, respectively. The tail shaft 2ᵃ also carries a loose gear 25 which is permanently in mesh with an idler gear, not shown, in mesh also with the gear 8ᵃ. With the above described arrangement of gearing, it is apparent that when the drive shaft 1ᵃ is rotating, the gears 23, 24 and 25 will rotate freely on the tail shaft 2ᵃ at different speeds, the gear 25 rotating in the opposite direction from the gears 23 and 24. This particular arrangement of gearing is shown merely as another illustrative embodiment of my invention, which has to do with effecting a driving connection between the tail shaft $2^a$ and the drive shaft $1^a$, or between the tail shaft $2^a$ and any one of the gears 23, 24 and 25.

As best shown in Figs. 9 to 12, the tail shaft $2^a$ is provided with sets of radially extending spaced lugs 26, between which pairs of dogs $14^a$ are adapted to slide, and a second set of lugs $26^a$ are carried by a sleeve keyed to shaft $2^a$. The lugs 26 have substantially the same cross section as the radial portions between the slots 13 in the gear sleeve 10, shown in Fig. 4, while the dogs $14^a$ have substantially the same form as the dogs 14. The dogs $14^a$ however are shorter than the lugs 26, as clearly shown at the right in Fig. 8, so that when one end of a dog $14^a$ projects beyond the lugs 26 the other end is entirely inside the lugs. The end of the shaft $1^a$ as well as each of the gears 23, 24 and 25 are provided with sets of spaced abutments $12^a$, $12^a$ which correspond in number to the number of lugs 26 and are similar in form to the abutments 12 provided on the shaft 2, as shown in Fig. 5.

As best shown in Fig. 8, sleeves 27 and 28 surround the shaft $2^a$ between the gears $4^a$ and 23 and the gears 24 and 25, respectively, each sleeve being slidably supported on a set of lugs 26. The sleeves are provided with internal grooves $27^a$ and $28^a$, which are adapted to receive the curved portions of levers 29 located at diametrically opposite points on the shaft $2^a$, as shown in Fig. 9. Each lever 29 provides operating prongs 30 which extend into notches 31 provided in opposed faces of a pair of dogs $14^a$. The middle portion of each lever 29 is provided with oppositely inclined edges which engage opposite sides of the corresponding groove $27^a$ or $28^a$, so that longitudinal movement of one dog $14^a$ between the lugs 26 is transmitted through the rocking lever 29 to the other dog of the pair to cause longitudinal movement of the same amount in the opposite direction, just as described with reference to the dogs 14.

In Fig. 8 the sleeve 27 is shown in what might be termed a neutral position, with its dogs $14^a$ entirely out of engagement with the oppositely facing sets of abutments $12^a$ provided by the end of the shaft $1^a$ and the gear 23. Each of the sleeves 27 and 28 is adapted to be shifted longitudinally of the shaft $2^a$ by means of a lever, and the sleeve 28 is shown as having been shifted to the left to bring its dogs $14^a$ into operative engagement with the abutments $12^a$ provided on the rotating gear 24.

As the sleeve 28 is shifted toward the gear 24 it is evident that the rocking lever 29 in the groove $28^a$ will shift the dogs $14^a$ longitudinally of the shaft $2^a$ between the lugs 26. This movement of the dogs $14^a$ results in first one dog and then the other of each pair being projected into the spaces between the abutments $12^a$ on the rotating gear 24, the dogs $14^a$ cooperating with the abutments $12^a$ in substantially the same manner as described with reference to the dogs 14 and the abutments 12, shown in Fig. 3. That is to say, the completion of the shifting movement of the sleeve 28 insures that both dogs $14^a$ of each pair will be moved into position between the abutments $12^a$ so as to impart the rotative movement of the gear 24 to the shaft $2^a$ in either direction. When it is desired to uncouple the gear 24 from the shaft $2^a$ it is only necessary to shift the sleeve 28 to the right, which results in the withdrawal of the dogs $14^a$ from between the abutments $12^a$. If the shifting movement of the sleeve 28 is continued to the right it is evident that the opposite ends of the dogs $14^a$ will then be projected into operative engagement with the set of abutments $12^a$ that are carried by the gear 25, so that one sleeve and one set of dogs suffices to establish a driving connection between the shaft $2^a$ and two different gears rotating thereon. This corresponds to the ability of either one of the gear sleeves 9 or 10 to establish a driving connection between the shaft 2 and either one of two different rotating gears.

Obviously, as already shown, my invention is of that type which is particularly susceptible to variation in the nature of reversals of parts, and many further modifications of this nature could be made without departing from the spirit of my invention as set forth in the appended claims.

From the foregoing it is apparent that by my invention I have provided an improved device for establishing a driving connection between coaxial rotatable elements, one of which is rotatably driven and one of which is capable of being shifted longitudinally along the axis of the other element. My improved device is characterized by its extreme simplicity and effectiveness in operation, the driving connection being established for either direction of rotation without the use of any springs, and being automatically carried out by the completion of the longitudinal shifting movement of one element with respect to the other. Furthermore, my device is effective to establish a driving connection in response to movement of one of the elements in either direction along its axis, whereby one set of clutching dogs is adapted to impart rotation to the driven element at two different speeds and in opposite directions of rotation, if desired.

I claim:

1. In a device of the class described, coaxial elements capable of relative movement of rotation, abutments carried by one of said elements, a pair of members slidably carried by the other of said elements in a direction parallel to the common axis, a pair of power transmitting or receiving surfaces on said slidable members, a pair of power transmitting or receiving surfaces on said abutments, one of said pair of surfaces on one pair of said parts facing in opposite directions, coupling means connecting said members, and means for moving said coupling means to carry the members into engagement with the abutments, the said two coaxial elements being then positively connected in both directions of rotation.

2. In a device of the class described, coaxial elements capable of relative movement of rotation, abutments carried by one of said elements, a pair of members slidably carried by the other of said elements in a direction parallel to the common axis, power transmitting or receiving surfaces on said slidable members, said surfaces facing in opposite directions and being spaced, in degrees of rotation, substantially the same amount as the angular distance between opposite surfaces of two separated abutments, coupling means connecting said members, and means for moving the said coupling means to carry the members into engagement with the abutments, the said two coaxial elements being then positively connected in both directions of rotation, without any appreciable back lash.

3. In a device of the class described, coaxial elements capable of relative movement of rotation, abutments carried by one of said elements, a pair of members slidably carried by the other of said elements in a direction parallel to the common axis, a lever connecting said members, and means for relatively moving said members into engagement with the abutments.

4. In a device of the class described, coaxial elements capable of relative movement of rotation, abutments carried by one of said elements, a pair of members slidably carried by the other of said elements in a direction parallel to the common axis, a coupling lever connecting said members, whereby relative movement of said coupling lever projects one of said pair of members between said abutments in response to the reaction on the other of said members, whereupon the second of said members is likewise projected between said abutments, thus holding said elements clutched together without any substantial back lash.

5. In a device of the class described, coaxial elements capable of relative movement of rotation, abutments carried by one of said elements, a pair of members slidably carried by the other of said elements in a direction parallel to the common axis, coupling means connecting said members, radial plane surfaces on said members, and radial plane surfaces on the sides of said abutments, said plane surfaces on the abutments and the members being angularly displaced substantially in equal amount and facing in opposite directions, whereby to clutch said elements together in either direction of rotation without any substantial back lash.

6. In a device of the class described, coaxial elements capable of relative movement of translation, one of said elements carrying spaced fixed abutments and the other of said elements carrying a pair of movable dogs wider than the spaces between said abutments, whereby completion of the relative movement between said elements causes one dog by its reaction with an abutment to force the other into driving position between said abutments.

7. In a device of the class described, coaxial elements capable of relative movement of translation, one of said elements carrying spaced fixed abutments and the other of said elements carrying a pair of movable dogs wider than the spaces between said abutments, whereby completion of the relative movement between said elements causes first one dog and then the other to be projected between abutments by the reaction between said dogs and said abutments.

WALDO J. GUILD.